US006647456B1

(12) United States Patent
Van Dyke et al.

(10) Patent No.: US 6,647,456 B1
(45) Date of Patent: Nov. 11, 2003

(54) HIGH BANDWIDTH-LOW LATENCY MEMORY CONTROLLER

(75) Inventors: James M. Van Dyke, Sunnyvale, CA (US); Nicholas J. Foskett, Mountain View, CA (US); Brad Simeral, San Francisco, CA (US); Sean Treichler, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 226 days.

(21) Appl. No.: 09/792,874

(22) Filed: Feb. 23, 2001

(51) Int. Cl.$^7$ .............................................. G06F 12/00
(52) U.S. Cl. ........................ 711/105; 711/154; 711/169
(58) Field of Search ............................. 711/5, 105, 151, 711/154, 158, 168, 169

(56) References Cited

U.S. PATENT DOCUMENTS

| | | | | |
|---|---|---|---|---|
| 6,026,464 A | * | 2/2000 | Cohen ........................... | 711/5 |
| 6,173,381 B1 | * | 1/2001 | Dye ............................. | 711/170 |
| 6,295,586 B1 | * | 9/2001 | Novak et al. ................. | 711/154 |
| 6,452,600 B1 | * | 9/2002 | Parikh et al. ................. | 345/522 |
| 6,470,433 B1 | * | 10/2002 | Prouty et al. ................. | 711/168 |
| 2001/0000822 A1 | * | 5/2001 | Dell et al. ................... | 711/170 |

* cited by examiner

Primary Examiner—Matthew Kim
Assistant Examiner—Woo H. Choi
(74) Attorney, Agent, or Firm—Silicon Valley IP Group, PC; Kevin J. Zilka

(57) ABSTRACT

At memory controller system is provided including a plurality of memory controller subsystems each coupled between memory and one of a plurality of computer components. Each memory controller subsystem includes at least one queue for managing pages in the memory. In use, each memory controller subsystem is capable of being loaded from the associated computer component independent of the state of the memory. Since high bandwidth and low latency are conflicting requirements in high performance memory systems, the present invention separates references from various computer components into multiple command streams. Each stream thus can hide precharge and activate bank preparation commands within its own stream for maximum bandwidth. A page context switch technique may be employed that allows instantaneous switching from one look ahead stream to another to allow low latency and high bandwidth while preserving

56 Claims, 9 Drawing Sheets

HIGH BANDWIDTH-LOW LATENCY MEMORY CONTROLLER

FIELD OF THE INVENTION

The present invention relates to accessing memory, and more particularly to reducing latency and increasing bandwidth while accessing memory.

BACKGROUND OF THE INVENTION

Dynamic Random Access Memories (DRAMs) have long been a popular choice for use as main memory in computer systems, especially for low cost computer systems such as personal computers (PCs) and workstations. This is largely because DRAMs use a simple memory cell geometry that permits implementation of large memory arrays at minimum cost and power consumption on a single semiconductor chip.

However, as processor speeds increase beyond a certain point, DRAM technology has been found to have significant access time incompatibilities. This is because the switching speed within a conventional DRAM memory cell is not as fast as the switching speeds now common in central processing units (CPUs). As a result, when using high speed processors with conventional DRAMs, the processor must frequently wait for memory accesses to be completed.

In a DRAM, all of the cells in a given group of memory locations, or a so-called "row," are activated at the same time. Multiple read or write operations can thus be performed with various cells within the row, but only while it is active. If a new access is to be made to a different row, a precharge operation must be completed to close the presently active row then an activate operation must be performed to a different row.

Therefore, a delay equal to the precharge time and activate time is experienced whenever a different row must be accessed on a subsequent transaction. However, the precharge operation is only necessary if the row address changes; if the row address does not change on the subsequent access, the precharge operation has been unnecessarily executed and the device unnecessarily placed in an idle state.

A new type of DRAM, called a synchronous DRAM (SDRAM), is rapidly becoming a popular option for use as main memory. SDRAMs use the same memory cell technology as DRAMs, which is to say they use a single complimentary metal-oxide-semiconductor (CMOS) transistor switch coupled to a storage capacitor. There are, however, several differences in the internal structure of an SDRAM that provide certain speed advantages.

The first such difference is that the operation of an SDRAM is synchronous. In particular, read/write access and refresh cycles occur synchronously with a master clock signal. Therefore, a computer system can be designed using SDRAMs, knowing the exact timing of events within the memory.

Second, being synchronous, SDRAM arrays can be split into two or more independent memory banks, and two or more rows can therefore be active simultaneously, with one open row per independent bank. If a computer system is designed to support interleaved accesses to multiple rows, SDRAMs make it possible to complete these accesses without intervening precharge and activate operations, provided that the rows to be accessed are all in separate SDRAM banks.

In use, an SDRAM may be accessed by multiple components such as a central processing unit (CPU), display refresh module, graphics unit, etc. Different components are given varying levels of priority based on the effect of latency on the component. For example, a display refresh module may be given a higher priority in accessing the SDRAM since any latency may result in easily-noticed, detrimental visual effects.

FIG. 1A illustrates a prior art system 100 by which commands for the read/write, activate and precharge operations may be sent to the SDRAM, in accordance with the prior art. As shown in FIG. 1A, a first queue 101 is provided for queuing the read/write commands. As indicated earlier, such read/write commands may be associated with different banks. Also provided is a second queue 102 for queuing the activate and precharge commands. The output of the first queue 101 and the second queue 102 are then sent to a multiplexer 104 which, in turn, feeds the commands to a SDRAM 106 for carrying out the operations set forth hereinabove.

FIG. 1A-1 illustrates a timing diagram 108 associated with the read/write, activate and precharge commands that are sent to the SDRAM 106. In use, read/write commands may be queued serially for reading data from and writing data to various banks of the SDRAM 106. As shown, the precharge and activate commands for a first bank 110 are queued followed by precharge and activate commands for a second bank 112. It is important to note that the timing associated with the loading of the precharge and activate commands must be handled in a strict serial manner so that each of the appropriate banks are prepared for the corresponding read/write commands in the first queue 101 of FIG. 1A.

Due to the fact that the precharge and activate commands are loaded from a single queue 101, the prior art system 100 must finish loading the precharge and activate commands for the first bank 110 before loading the precharge and activate commands for the second bank 112. This inherently increases the latency and reduces bandwidth associated with memory accesses to the SDRAM 106.

An example of such problem will now be set forth. In conventional prior art computer systems, it is important for CPU traffic to have the lowest latency possible since it is typically stalled when waiting on the fulfillment of read commands. On the other hand, bandwidth, not latency, is important to graphics-related computer components. To efficiently use memory such as DRAMs and SDRAMs, it is important have the target bank opened to the correct row prior to the read/write operation. If the bank is not open, it must be activated to the target row. If the bank is opened to a different row, it first must be precharged and subsequently activated to the target row.

As is observed in prior art system 100 of FIG. 1A, the read/write commands are delayed in a queue while the bank is being prepared using precharge and activate commands. In this way, read/write commands to a previous bank are executed while preparation of the next target bank takes place. Unfortunately, this adds latency to the CPU read access path because previous references from other requestors must be executed before any CPU request.

There is thus a need for a memory controller that exhibits lower latency and higher bandwidth.

DISCLOSURE OF THE INVENTION

A memory controller system is provided including a plurality of memory controller subsystems each coupled between memory and one of a plurality of computer components. Each memory controller subsystem includes at least one queue for managing pages in the memory. In use, each memory controller subsystem is capable of being loaded from the associated computer component independent of the state of the memory.

In one embodiment of the present invention, each memory controller subsystem includes at least one read/write queue with an input coupled to one of the computer components and an output coupled to the memory for queuing read commands and write commands to be sent to the memory. Next provided is at least one precharge/activate queue with an input coupled to one of the computer components and an output coupled to the memory for queuing precharge and activate commands to be sent to the memory.

In one aspect of the present embodiment, the precharge/activate queue may include a precharge queue with an input coupled to one of the computer components and an output coupled to the memory for queuing precharge commands to be sent to the memory, and an activate queue with an input coupled to one of the computer components and an output coupled to the memory for queuing activate commands to be sent to the memory.

In another aspect of the present embodiment, the memory may include dynamic random access memory (DRAM), synchronous dynamic random access memory (SDRAM), and/or dual data rate (DDR) memory. Further, the aforementioned computer components may include a central processing unit, a display refresh module, and/or a graphics unit.

In yet another aspect of the present embodiment, the commands may be loaded in at least one of the queues of each memory controller subsystem based on rows and banks of references in at least one of the queues. Further, the loading of the commands may be delayed based on the rows and banks of references. One optional rule associated with the present embodiment includes requiring each read/write queue to load commands for only a single row in each bank.

In still yet another aspect of the present embodiment, the precharge commands in the precharge queue and the activate commands in the activate queue may be capable of being restored to a row and a bank associated with the read commands and write commands at a head of the read/write queue.

In another embodiment of the present invention, a controller may be provided which is capable of receiving a plurality of read commands, write commands, precharge commands and activate commands from the queues. As mentioned earlier, such queues are capable of being loaded from a plurality of computer components independent of the state of the memory. In operation, the delivery of the read commands, write commands, precharge commands and activate commands from the queues to the memory may be arbitrated by the controller. Thereafter, the arbitrated read commands, write commands, precharge commands and activate commands may be delivered to the memory.

In one aspect of the present embodiment, the delivery of the read commands, write commands, precharge commands and activate commands from the queues to the memory may be arbitrated utilizing a timer. As an option, the timer may arbitrate the delivery of the commands to ensure that sequential commands are delivered sequentially.

In another aspect of the present embodiment, the delivery of the read commands, write commands, precharge commands and activate commands from the queues to the memory may be arbitrated based on a predetermined order. Such predetermined order may prioritize the computer components and/or the read commands, the write commands, the precharge commands and the activate commands.

In yet another aspect of the present embodiment, the delivery of the commands may be arbitrated based on a bank and a row at a head of the queues. Further, the delivery of the commands may be arbitrated based on the read commands and write commands. Also, the delivery of the commands may be arbitrated based on computer component bandwidth sharing.

As an option, the memory controller may be capable of determining if banks specified by the precharge queue and the activate queue are activated or precharged. As such, the precharge command queued in the precharge queue may be disregarded (i.e. unloaded) if the corresponding bank of the memory is determined to be precharged. Further, the activate command queued in the activate queue may be disregarded (i.e. unloaded) if the corresponding bank of the memory is determined to be activated to the corresponding row. Moreover, the read commands, write commands, precharge commands and activate commands may be arbitrated based on the state of the memory.

Since high bandwidth and low latency are conflicting requirements in high performance memory systems, the present invention separates references from various computer components into multiple command streams. Each stream thus can hide precharge and activate bank preparation commands within its own stream for maximum bandwidth. Were these streams to be mixed, a high priority request would be serialized behind outstanding low priority requests.

While separating the multiple command streams may create a problem managing bank state of the memory for look ahead precharge and activate preparation, a page context switch technique may be employed that allows instantaneous switching from one look ahead stream to another to allow low latency while preserving maximum bank state from the previous stream.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIG. 1A-1 illustrates a timing diagram associated with the read/write, activate and precharge commands that are sent to the SDRAM;

FIG. 2A-1 illustrates the manner in which the various queues of the command queue module operate, in accordance with one embodiment of the present invention;

DESCRIPTION OF THE PREFERRED EMBODIMENTS

Figure 1A:
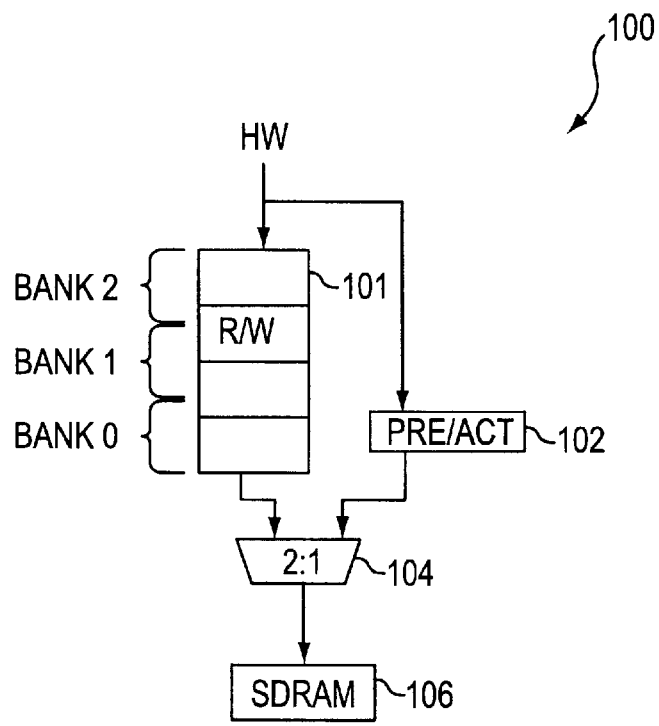
FIG. 1A illustrates a prior system by which commands for the read/write, activate and precharge operations may be sent to a SDRAM, in accordance with the prior art.
Figures 1, 1A:
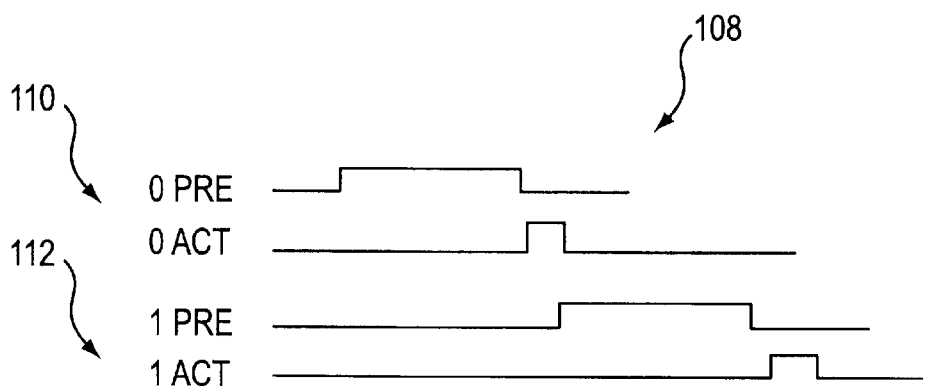
Figure 1B:
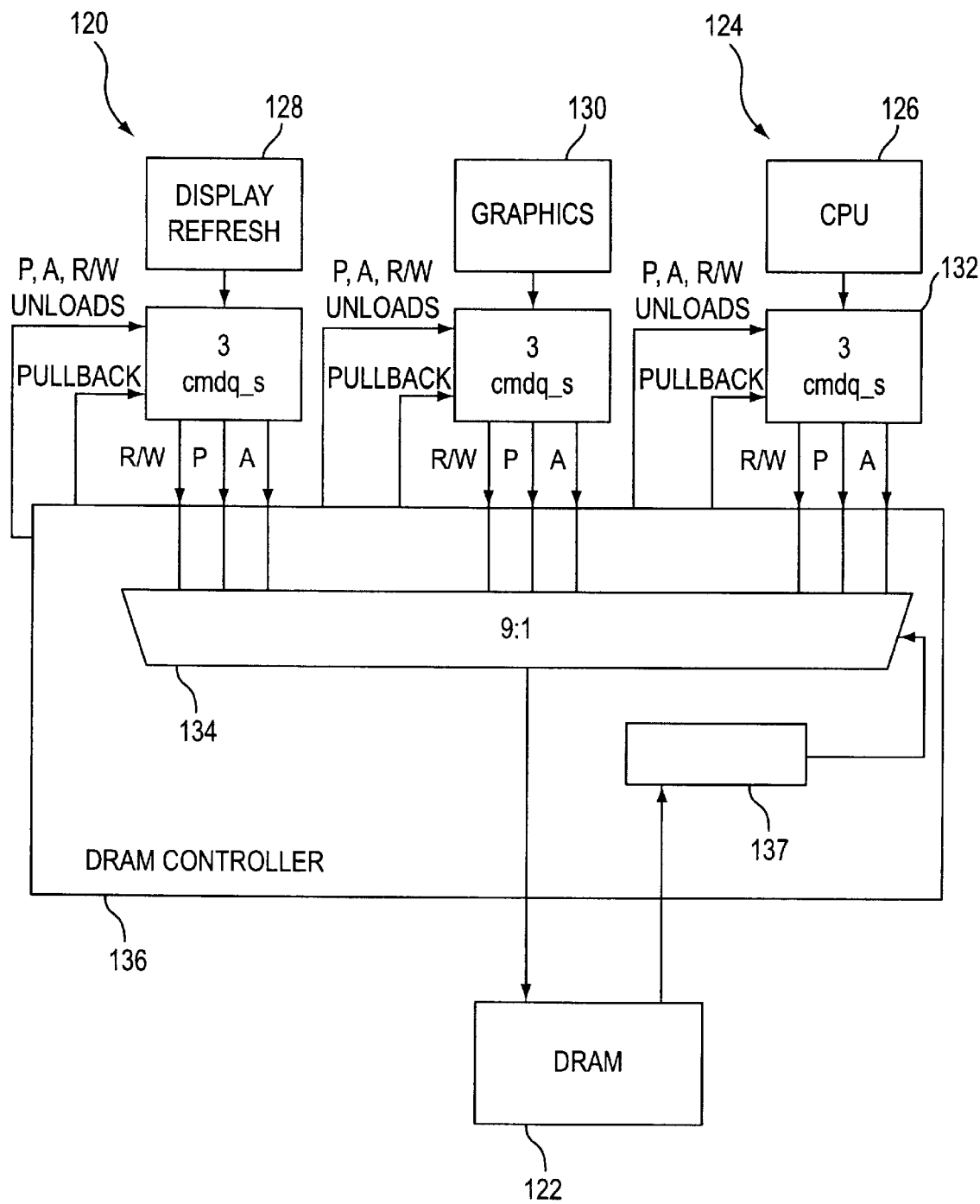
FIG. 1B is a schematic showing a memory controller system coupled between memory and a plurality of computer components.

FIGS. 1A and 1A-1 illustrate the prior art. FIG. 1B is a schematic showing a memory controller system 120 coupled between memory 122 and a plurality of computer components 124.

In one embodiment, the memory 122 may include dynamic random access memory (DRAM), synchronous dynamic random access memory (SDRAM), dual data rate memory (DDR), or any other type of applicable type of memory. Further, the computer components 124 may include a central processing unit 126, a display refresh module 128, a graphics unit 130, or any other component of a computer that requires access to the memory 122.

As shown in FIG. 1B, the memory controller system 120 may include a plurality of memory controller subsystems 132 for interfacing between the memory 122 and the various computer components 124. Further, a DRAM controller 136 may be coupled between the memory controller subsystems 132 and the memory 122 for feeding the contents of the memory controller subsystems 132 to the memory 122. The DRAM controller 136 may include a multiplexer 134 and other control components 137 for managing the manner in which the contents of the memory controller subsystems 132 are sent to the memory 122. More information regarding the DRAM controller 136 and the various components 137 thereof will be set forth during reference to FIGS. 3A and 3B.

In use, the memory controller subsystems 132 are each capable of queuing read/write commands, precharge commands, and activate commands received from the computer components 124 for delivery to the memory 122. Further, such memory controller subsystems 132 also receive read/write unload, precharge unload, activate unload, and pull back signals from the DRAM controller 136 for facilitating operation in a manner that will soon be set forth. It should be noted that the memory controller system 120 may be configured in any desired manner that is capable of being loaded independent of the state of the memory 122.

Figure 1C:
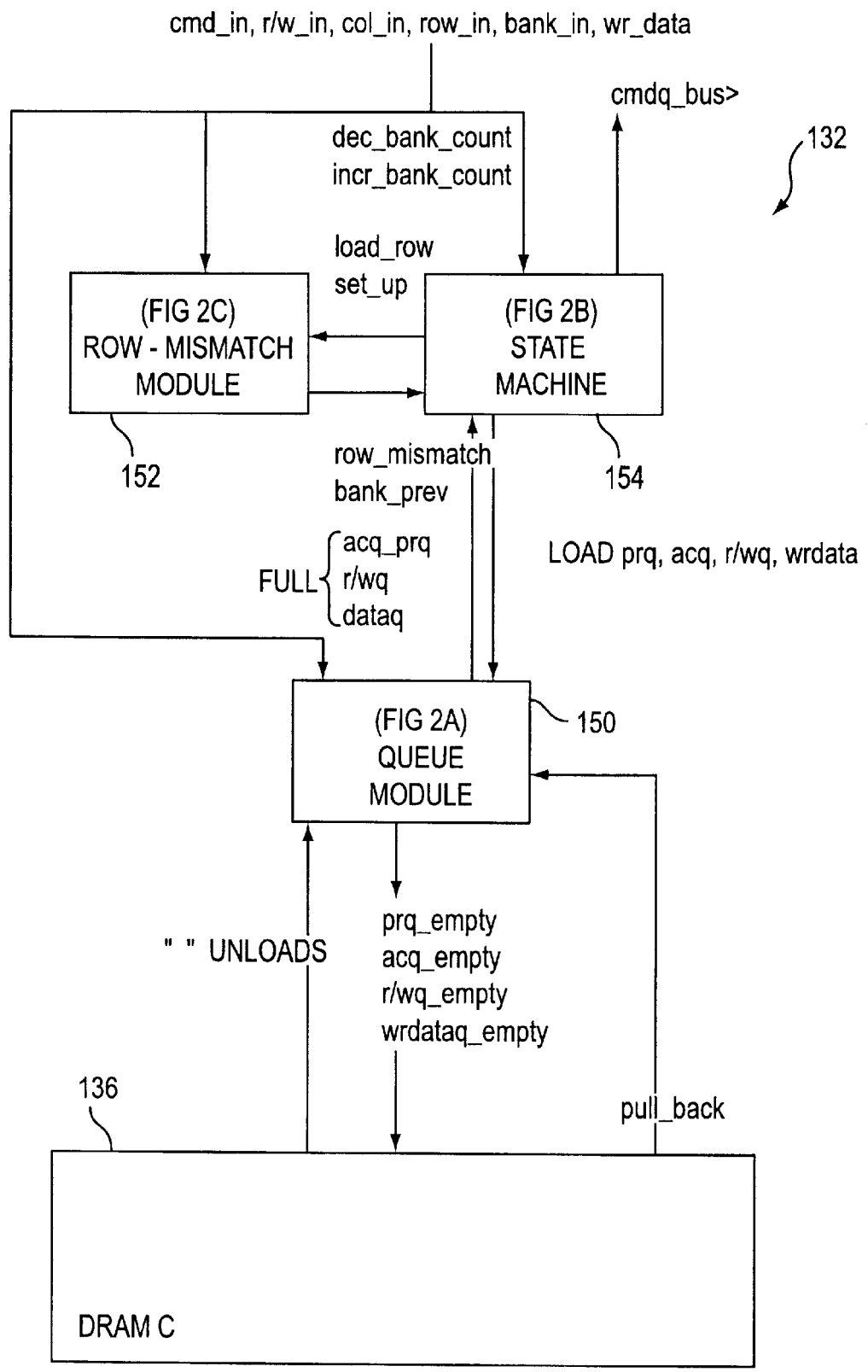
FIG. 1C is a schematic showing generally the various components associated with each of the memory controller subsystems of FIG. 1B, in accordance with one embodiment of the present invention.

FIG. 1C is a schematic showing generally the various components associated with each of the memory controller subsystems 132, in accordance with one embodiment of the present invention. As shown, each of the memory controller subsystems 132 includes a command queue module 150, a row mismatch module 152, and a state machine 154. In use, each of the memory controller subsystems 132 receives read commands, write commands, row identification signals, column identification signals, and bank identification signals which are all received from the computer components 124. In response thereto, the memory controller subsystems 132 generate precharge commands and activate commands in a manner that will soon be set forth.

Figure 2A:
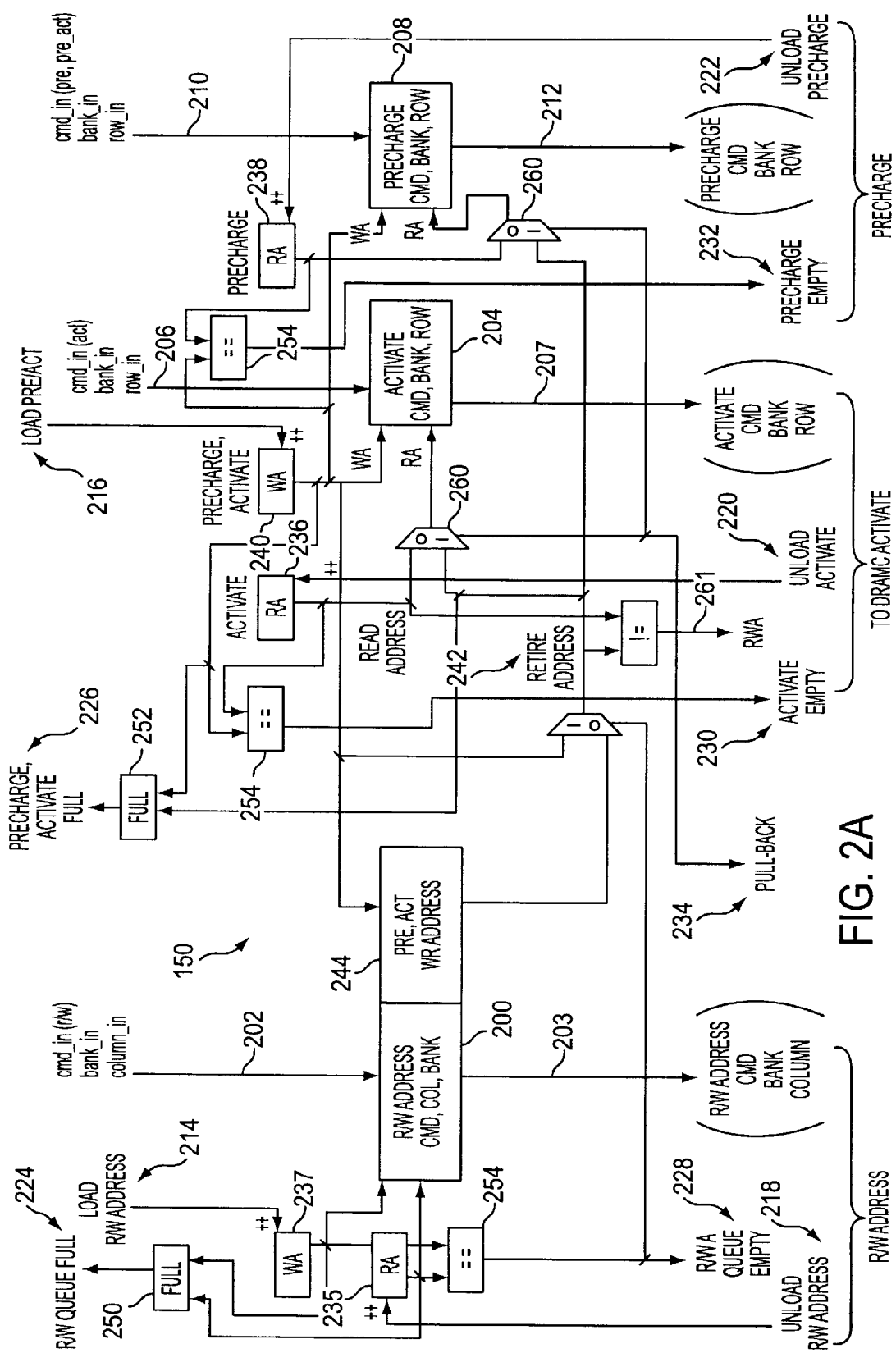
FIG. 2A is a schematic showing the command queue module of FIG. 1C in greater detail, in accordance with one embodiment of the present invention.
Figures 1, 2A:
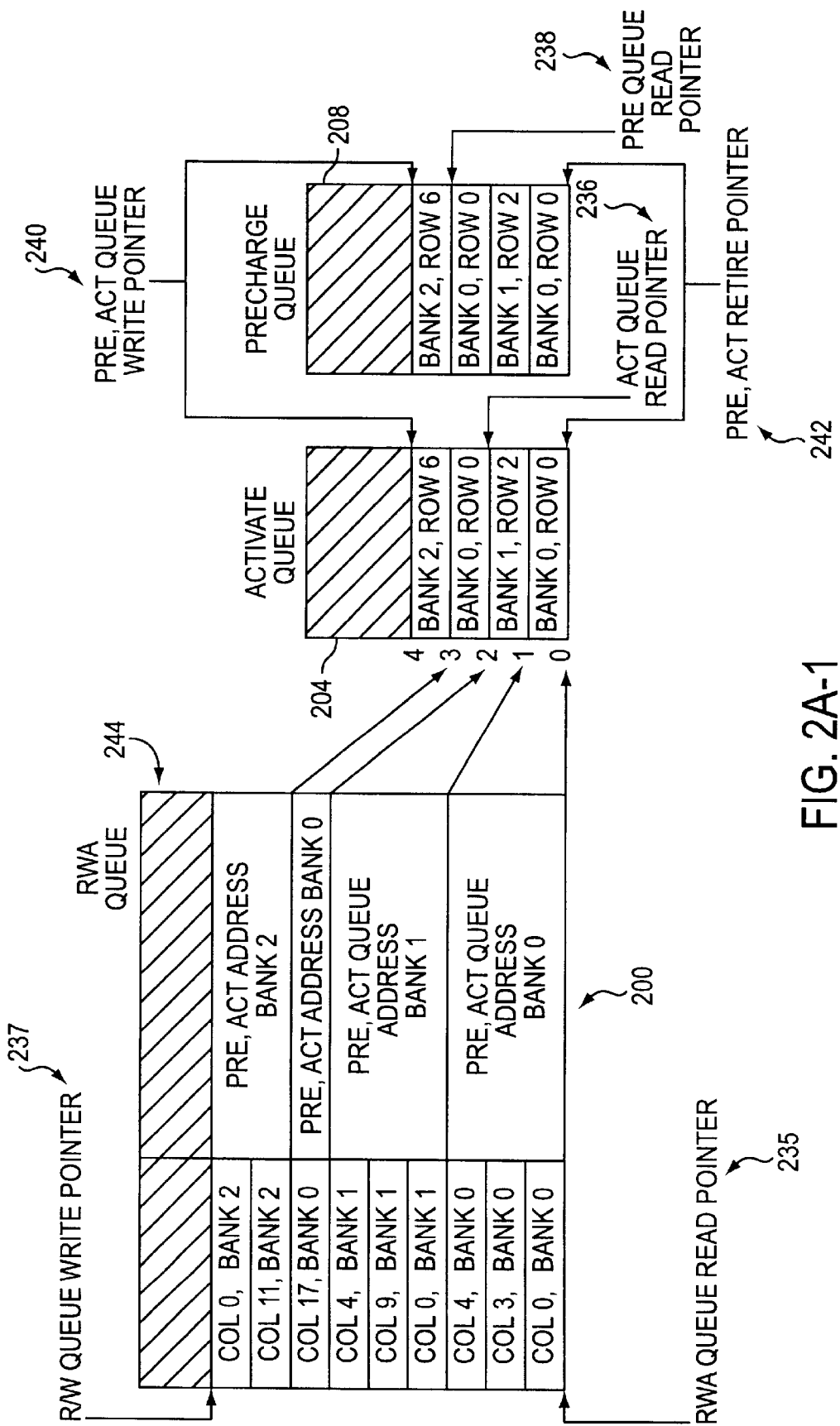

FIG. 2A is a schematic showing the command queue module 150 of FIG. 1C in greater detail, in accordance with one embodiment of the present invention. As shown, at least one read/write queue 200 is included with an input 202 coupled to a corresponding one of the computer components 124 and an output 203 coupled to memory 122 via the DRAM controller 136.

In use, the read/write queue 200 is adapted for queuing read commands and write commands to be sent to the memory 122. As shown, the input 202 of the read/write queue 200 receives the read commands, the write commands, the column identification signals, and the bank identification signals. Additional input is also received for reasons that will soon be set forth. Further, the output 203 of the read/write queue 200 transmits read address identification signals, write address identification signals, the column identification signals, and the bank identification signals.

Also included is an activate queue 204 with an input 206 coupled to a corresponding one of the computer components 124 and an output 207 coupled to memory 122 via the DRAM controller 136. In use, the activate queue 204 is adapted for queuing activate commands to be sent to the memory 122. As shown, the input 206 of the activate queue 204 receives the activate commands, the row identification signals, and the bank identification signals. Additional input is also received for reasons that will soon be set forth. Moreover, the output 207 of the activate queue 204 transmits the activate commands, the row identification signals, and the bank identification signals.

Still yet, a precharge queue 208 is included with an input 210 coupled to a corresponding one of the computer components 124 and an output 212 coupled to memory 122 via the DRAM controller 136. In use, the precharge queue 208 is adapted for queuing precharge commands to be sent to the memory 122. As shown, the input 210 of the precharge queue 208 receives the precharge commands, the row identification signals, and the bank identification signals. Additional input is also received for reasons that will soon be set forth. Moreover, the output 212 of the precharge queue 208 transmits the precharge commands, the row identification signals, and the bank identification signals.

In one embodiment, the activate queue 204 and the precharge queue 208 may be combined into a single activate/precharge queue.

Each command queue module 150 also receives load read/write signals 214, and load precharge/activate signals 216. Upon receipt of such read/write signals 214, the read and write commands at the input 202 of the read/write queue 200 are loaded into the read/write queue 200. In a similar manner, the activate and precharge commands at the inputs 206, 210 of the activate queue 204 the precharge queue 208, respectively, are loaded therein upon receipt of such load precharge/activate signals 216.

For unloading purposes, each command queue module 150 also receives unload read/write signals 218, unload activate signals 220, and unload precharge signals 222. Upon receipt of such unload signals, the associated commands, i.e. read/write, activate, and precharge, at the output (203, 207, 212, respectively) of the corresponding queue is loaded into memory 122 via the DRAM controller 136. The manner in which the load and unload signals are received will be set forth hereinafter in greater detail.

With continuing reference to FIG. 2A, it is shown that the read/write queue 200 has both a read pointer 235 and a write pointer 237. Further, the activate queue 204 and the precharge queue 208 are equipped with separate read pointers 236 and 238, respectively, but share a single write pointer 240.

It should be noted that only one write pointer 240 is required among the activate queue 204 and the precharge queue 208 since the activate and precharge commands must be loaded simultaneously in order to act as "bookmarks", as will be set forth hereinafter in greater detail. In use, the pointers indicate an address of the queue that must be loaded and unloaded with the appropriate commands.

In order to provide feedback regarding the status of each of the queues, read/write full signals 224, and activate/precharge full signals 226 may be transmitted to provide an indication that the corresponding queues are full. In an analogous manner, read/write empty signals 228, active empty signals 230, and precharge empty signals 232 may be utilized to indicate that the associated queues are empty.

The manner in which the read/write fill signals 224, activate/precharge full signals 226, read/write empty signals 228, active empty signals 230, and precharge empty signals 232 are generated will now be set forth.

In particular, the read/write full signals 224 are generated as a function of the write pointer 237 and the read pointer 235 using a first full function module 250. A second full function module 252 operates in a similar manner to generate the activate/precharge full signals 226 with the exception of incorporating a retire address signal 242.

Specifically, the activate/precharge full signals 226 are generated as a function of the write address indicated by the write pointer 240 and a retire address signal 242. The retire address signal 242 acts as a pointer for restoring the read address of the precharge and activate queues (208 and 204) to the row and bank associated with the read/write commands at a head of the read/write queue. This may be facilitated in any desired manner, i.e. employing a field 244 in the read/write queue 200 that contains the precharge/activate write address indicated by the write pointer 240 when the precharge/activate queues (208 and 204) are written.

As such, the retire address signal 242 outputted by the write pointer 240 or the field 244 may be selectively multiplexed by the read/write empty signal 228 to ensure that the retire address signal 242 is valid even when the read/write queue 200 is empty.

A read/write always hit (RWA) signal 260 is outputted when the precharge and activate read pointers 236 and 238 are ahead of the output 203 of the read/write queue 200. In such case, the banks at the head of the precharge and activate queues 208 and 204, respectively, do not correspond to the head of the read/write queue 200. The use of the RWA signal 261 will be set forth hereinafter in greater detail.

Finally, a pull back signal 234 may be received from the DRAM controller 136 for "pulling back" the read pointers 236 and 238 so that they correspond to the head of the read/write queue 200. This may be accomplished by controlling a pair of multiplexers 260 to selectively direct either the signal from the appropriate read pointer (236, 238) or the retire address signal 242.

FIG. 2A-1 illustrates the manner in which the various queues of the command queue module 150 operate, in accordance with one embodiment of the present invention. As shown, the field 244 in the read/write queue 200 contains the appropriate precharge/activate address indicated by the activate queue 204 and the precharge queue 208.

Figure 2B:
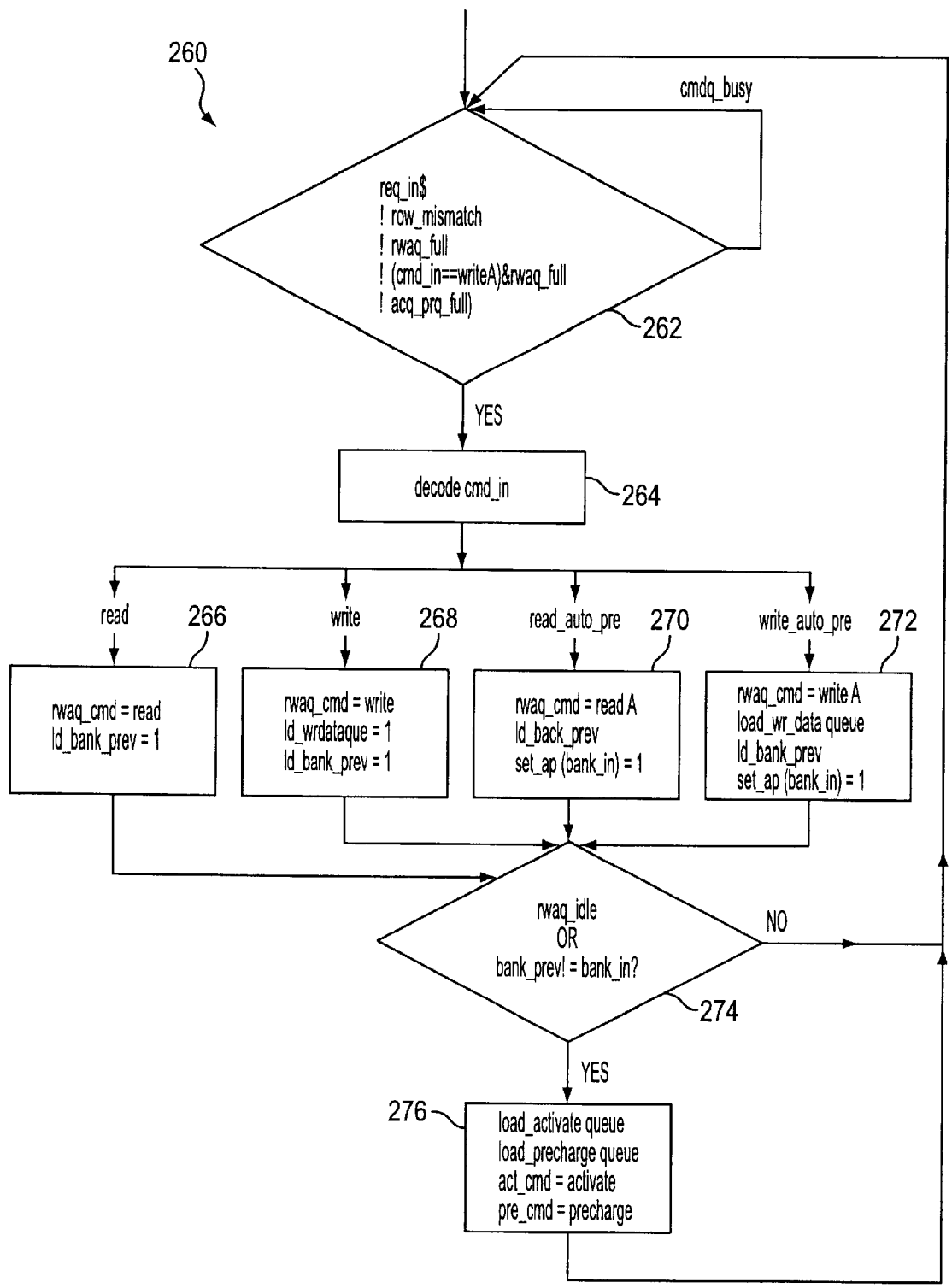
FIG. 2B is a flowchart illustrating a method for receiving commands from the computer components and controlling the command queue module of FIG. 2A, in accordance with one embodiment of the present invention.

FIG. 2B is a flowchart illustrating a method 260 for receiving commands from the computer components 124 and controlling the command queue module 150 of FIG. 2A, in accordance with one embodiment of the present invention. As shown, a command is first received from one of the computer components 124 after which a first decision 262 is made.

In particular, decision 262 ensures that all of the references in the command queue of a given bank correspond to the same row using a row mismatch signal (to be described hereinafter). Also determined in the first decision 262 is whether the read/write queue 200, activate queue 204, and/or precharge queue 208 are full. This may be determined utilizing the read/write full signals 224, and activate/precharge full signals 226. If a row mismatch status is confirmed or any of the appropriate queues are full, the first decision 262 polls in the manner shown.

Next, in operation 264, the received command is decoded to determine whether a read command, write command, read/autoprecharge command, or write/autoprecharge command has been received. If it determined that the read command was received in operation 264, the command signal at the input 202 of the read/write queue 200 is set to read. Further, a load bank previous signal is set to "1" for reasons that will be set forth during reference to FIG. 2C. Note operation 266.

If it determined that the write command was received in operation 264, the command signal at the input 202 of the read/write queue 200 is set to write. Further, a load read/write queue signal and a load bank previous signal are set to "1" for reasons that will soon become apparent. See operation 268.

Still yet, if it determined that a read autoprecharge command was received in operation 264, the command signal at the input 202 of the read/write queue 200 is set to read autoprecharge. Further, a load bank previous signal and a set autoprecharge (set_ap) signal are set to "1". Note operation 270. If it determined that the write command autoprecharge was received in operation 264, the command signal at the input 202 of the read/write queue 200 is set to write autoprecharge. Further, a load read/write queue signal, load bank previous signal, and a set_ap signal are set to "1" for reasons that will soon become apparent. See operation 272.

With continuing reference to FIG. 2B, it is determined in a second decision 274 whether a bank which was previously accessed is different that which is currently being accessed. This may be accomplished by comparing a bank previous address and the bank identified by the current command.

If the second decision 274 results in "YES," the activate queue 204 and precharge queue 208 may be loaded utilizing the load precharge/activate signals 216. Also, the input 206 of the activate queue 204 and the input 210 of precharge queue 208 may be set to the activate command and precharge command, respectively. Note operation 276. If, however, the answer is "NO" and it is determined in decision 274 that the bank which was previously accessed is that which is currently being accessed, it is not necessary to perform operation 276 since the precharge/activate queues (204 and 208) already contains precharge/activate commands for that particular bank row.

Figure 2C:
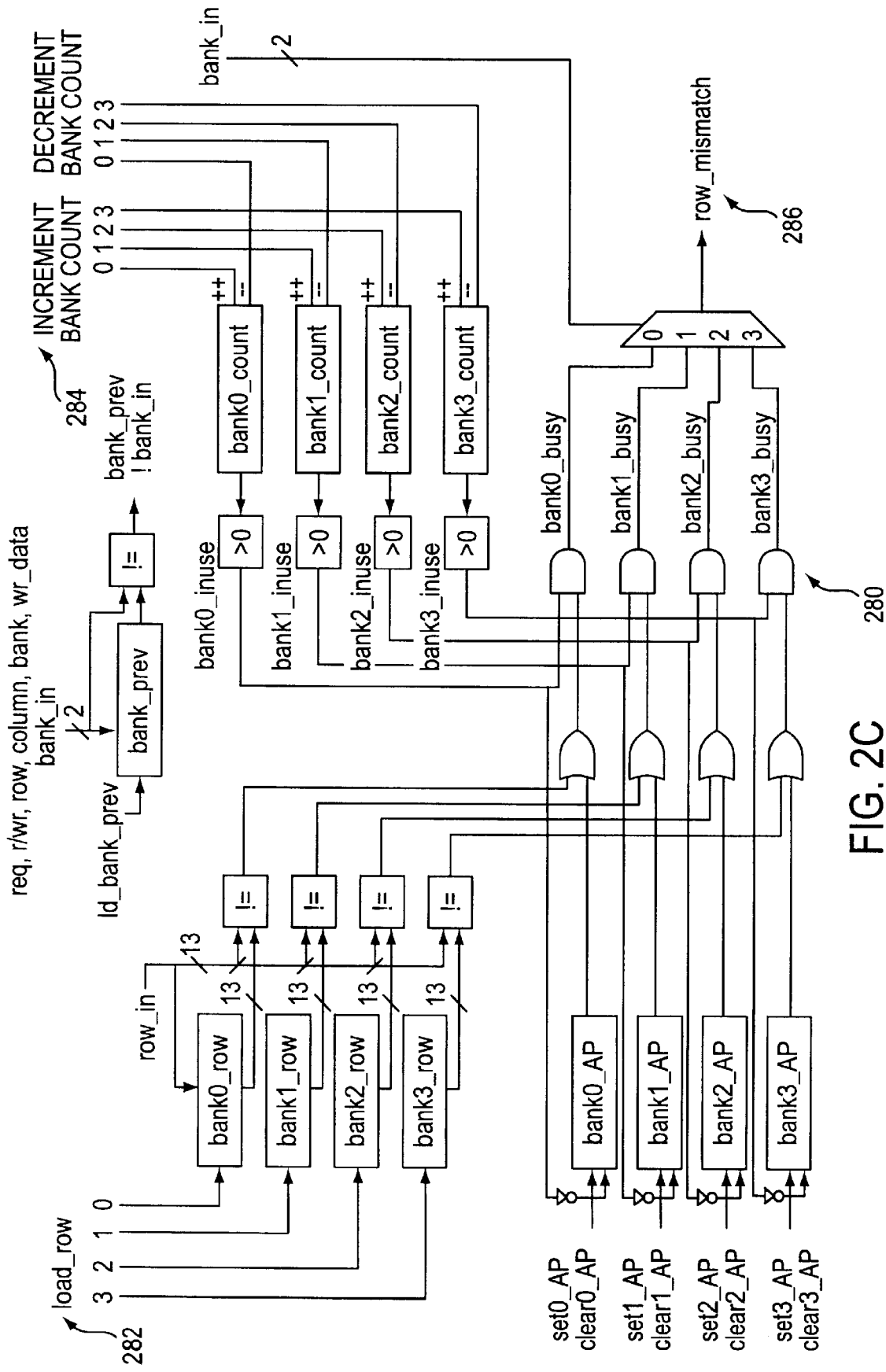
FIG. 2C illustrates a schematic showing the logic responsible for determining whether a current bank to be accessed is the subject of a row mismatch, and generating a row mismatch signal.

FIG. 2C illustrates a schematic showing the logic 280 responsible for determining whether a current bank to be accessed is subject of a row mismatch or pending autoprecharge, and generating a row mismatch signal. As shown in FIG. 2C, the logic 280 is capable of receiving load row signals 282 along with a plurality of increment and decrement signals 284 which are fed to the logic 280 including a plurality of AND and OR gates interconnected as shown. In use, the row mismatch signal 286 is generated to indicate that a bank is currently the subject of a row mismatch or pending autoprecharge.

In summary, the method 260 of FIG. 2B and the logic of FIG. 2C ensures that the commands are loaded and/or delayed in at least one of the queues of each memory controller subsystem 132 based on rows and banks of references in at least one of the queues.

Figure 3A:
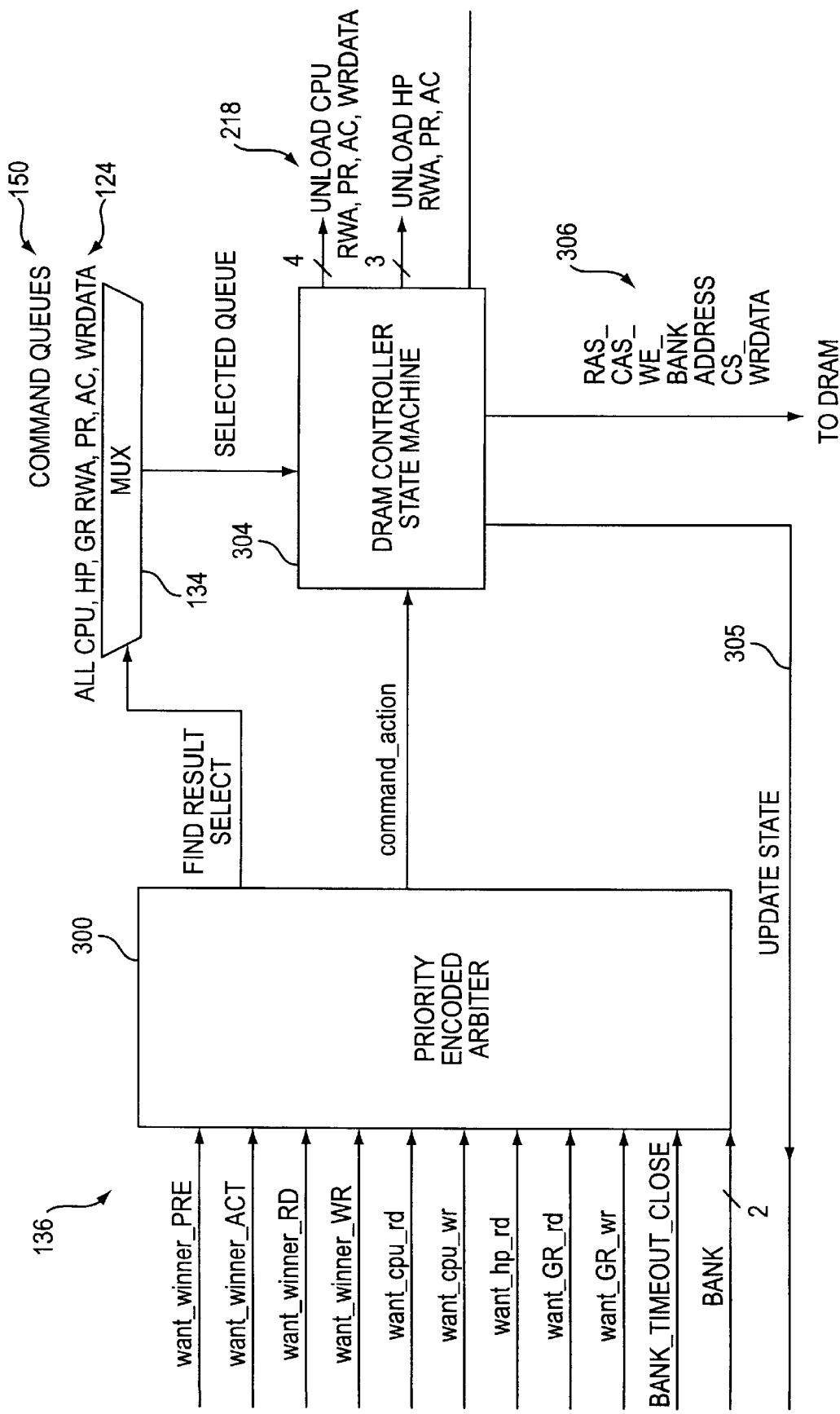
FIGS. 3A and 3B are schematics showing the DRAM controller of FIG. 1B.
Figure 3B:
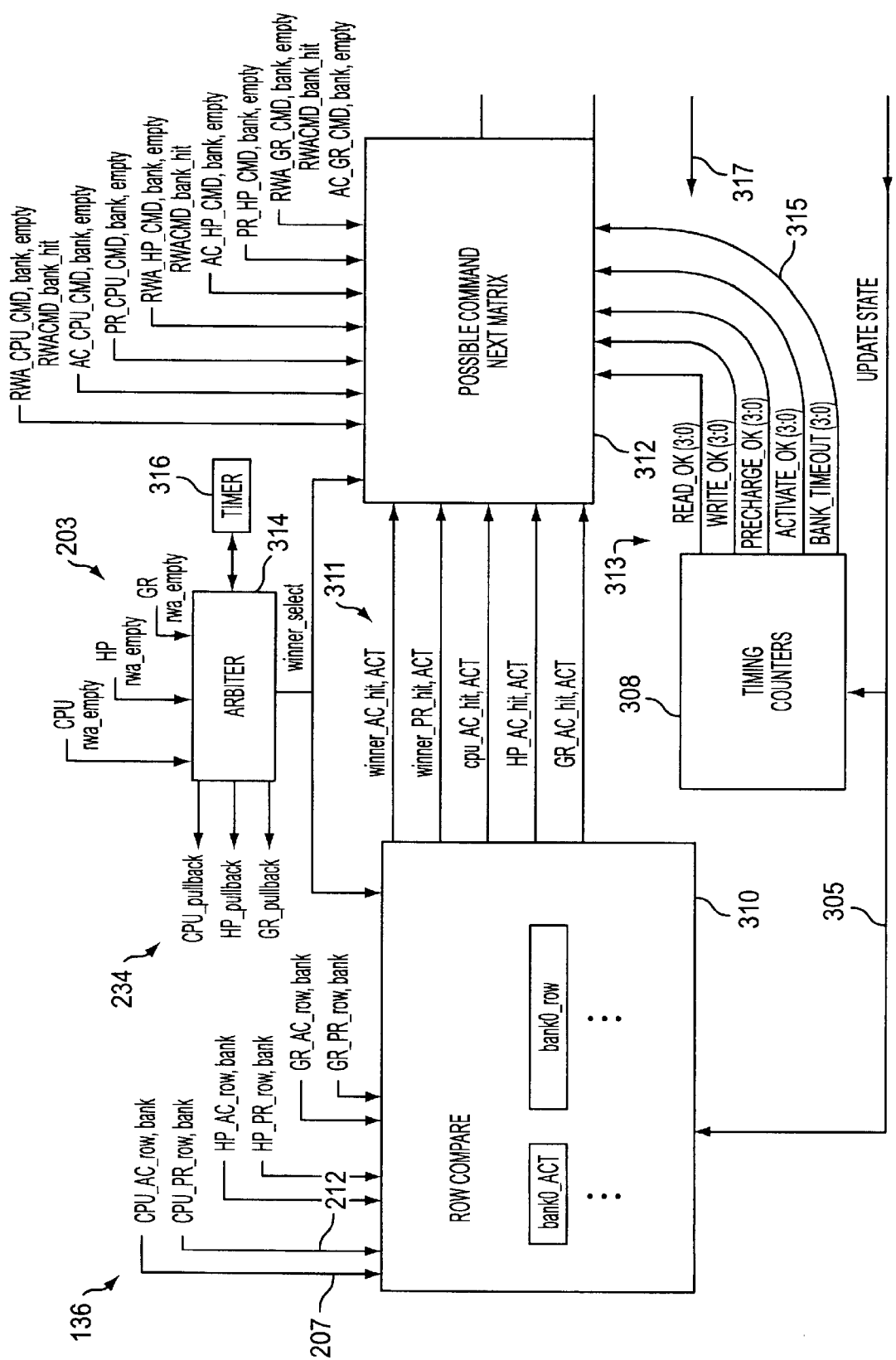

FIGS. 3A and 3B are schematics showing the DRAM controller 136 of FIG. 1B. As shown, the DRAM controller 136 includes a priority encoder arbiter 300 adapted to control the multiplexer 134 which is in turn coupled to the memory controller subsystems 132. Coupled to the multiplexer 134 is a priority encoder arbiter 300 and a DRAM controller state machine 304 which is adapted to transmit the unload read/write signals 218, the unload activate signals 220, and the unload precharge signals 222 to the various memory subsystems 132. Also coupled to the DRAM controller state machine 304 is the DRAM memory 122 for receiving various control signals 306 therefrom.

Still yet, the DRAM controller state machine 304 is capable of generating a state update signal 305. A plurality of timing counters 308, and a row compare module 310 are coupled to the DRAM controller state machine 304 for receiving the state update signal 305. Inputs of the row compare module 310 are coupled to outputs (212 and 207) of the precharge and activate queues (208 and 204, respectively) of the memory controller subsystems 132. The timing counters 308 and the row compare module 310 are in turn coupled to a possible command next matrix module 312.

An arbiter module 314 is also included, and is coupled to an associated timer 316. The arbiter module 314 is also coupled to the output 203 of the memory controller subsystems 132 for receiving the RWA signals 260 outputted therefrom. The arbiter module 314 is also adapted to deliver the pull back signals 234. Still yet, the arbiter module 314 is coupled to the row compare module 310 for reasons that will soon become apparent.

In operation, the DRAM controller 136 arbitrates between the memory controller subsystems 132. If a request arrives from the CPU 126, the DRAM controller 136 gives immediate memory access to the CPU 126. As such, a bandwidth sharing mechanism exists between the CPU 126 and the display refresh module 128 of the computer to avoid "tearing" exhibited by the screen or stalling of the CPU 126.

The timer 316 functions to ensure that the CPU 126 is granted a programmable number of clocks after a CPU request in order to keep the CPU target banks open in anticipation of more CPU requests. This may also prevent thrashing between the memory controller subsystems 132. In other words, the timer arbitrates the delivery of the commands to ensure that sequential commands are delivered sequentially.

It should be noted that, in the present description, requesting computer components 124 not granted access to the memory 122 by the DRAM controller 136 are referred to as "losers" and get the associated "pullback" signal 234 asserted. On the other hand, computer components 124 that are granted access to the memory 122 by the DRAM controller 136 are referred to as "winners."

In use, such pullback signals 234 reset the precharge and activate queue read pointers (238, 236, respectively) to the retire address indicated by the retire address signal 242. Note FIG. 2A. As set forth hereinabove, the retire address signal 242 points to elements in the precharge and activate queues (208 and 204, respectively) that correspond to the head of the read/write queue 200. By the pullback signals 234 resetting the read pointers (238 and 236) on the precharge and activate queues (208 and 204, respectively) associated with a losing computer component 124, the outputs of these queues are restored to the banks and rows corresponding to the head read or write commands in the read/write queue 200.

As mentioned earlier, the inputs of the row compare module 310 are coupled to outputs (212 and 207) of the precharge and activate queues (208 and 204, respectively) of the memory controller subsystems 132. The row compare module 310 maintains a state representing which banks of the DRAM memory 122 are open and to which row they are activated. The row compare module 310 determines if banks specified by the precharge and activate queues (208 and 204, respectively) are activated (i.e. act) and/or opened to the specified row (i.e. hit) utilizing associated act and hit signals 311.

In use, the arbiter module 314 chooses the read/write, activate and precharge queue (200 and 204 and 208, respectively) of the memory controller subsystem 132 which corresponds to the computer component 124 (i.e. central processing unit 126, a display refresh module 128, a graphics unit 130) that won the arbitration. The winning computer component 124 can issue precharge commands, activate commands, read commands, and write commands, i.e. change the bank state as well as issue read commands and/or write commands.

It should be noted that a losing computer component 124 can only issue read commands and/or write commands. If a bank of the memory 122 happens to be open to a row of a losing computer component 124, and the winning computer component 124 is busy issuing precharge and/or activate commands to a different bank (and not using the DRAM pins), the references of the losing computer component 124 can be issued during this time.

The present invention only allows the read commands of the losing computer component 124 to be transmitted to the DRAM memory 122, i.e. "slip in," if the pending winning computer component 124 is issuing a read command. In a similar manner, the present invention only allows the write commands of the losing computer component 124 to slip in if the winning computer component 124 issues a write command.

If such technique was not employed, read/write DRAM turnaround penalties would keep the OK signals (to be described later) to the winning computer component 124 false, and drain the queues of the memory controller subsystem 132 associated with the losing computer component 124 at the expense of the latency of the winning computer component 124. It should be noted that the update state signals 305 sent from the DRAM controller state machine module 304 also update the state of the row compare module 310.

Up to now in the present description, each losing computer component 124 can only get granted requests every other clock. This is due to the fact that it takes a clock cycle to update the precharge and activate queues (208 and 204, respectively) associated with the losing computer component 124 via the retire address signal 242 upon the DRAM controller 136 granting a losing computer component 124 access to the memory 122.

In one embodiment, this may be remedied by adding a row field to the read/write queues 200. It should be noted that this feature is only optional due to cost considerations. The losing computer components 124 also cannot be granted in the last cycle of a pullback signal 234 due to a one clock latency associated with updating the precharge and activate queues (208 and 204, respectively) via the retire address signal 242.

Ideally, the present invention waits for the precharge and activate queues (208 and 204, respectively) associated with the losing computer component 124 to update before determining if the next reference is a bank hit. The present invention also chooses the output 207 of activate queues 204 of the losing computer component 124 for hit and act comparisons, but the output 212 of precharge queues 208 may also work since both queues are reset utilizing the same retire address signal 242.

In operation, the timing counters 308 are triggered when commands are given to the DRAM memory 122. Such timing counters 308 ensure that the cycle-by-cycle timing rules of the DRAM memory 122 are not violated. Further, they may hold off, or stall, read commands, write commands, activate commands, precharge commands if a bank of the DRAM memory 122 is not ready.

When timing rules are met for a given operation on a bank, the corresponding READ_OK, WRITE_OK, PRECHARGE_OK, ACTIVATE_OK signals 313 may be asserted for that bank of the DRAM memory 122. It should be understood that there are OK signals 313 for each bank of the DRAM memory 122. The timing counters 308 also produce a programmable bank timeout signal 315 which is asserted when an open bank has not been used for a programmable amount of time.

In terms of functionality, the possible command next matrix module 312 serves to examine which banks of the DRAM memory 122 are (act, hit) utilizing the act and hit signals 311; which operations are OK to be sent to each bank utilizing the OK signals 311; the outputs from read/write queue 200, precharge queue 208 and activate queue 204 of each memory controller subsystem 132 associated with each of the computer component 124; and which computer component 124 is selected as the winning computer component 124 utilizing the output of the arbiter 314.

Taking all of such input into account, the possible command next matrix module 312 generates output indicating which operations are needed utilizing want signals 317. The winning computer component 124 can issue read commands, write commands, precharge commands and/or activate commands, and the explicitly labeled losing computer components 124 can only issue read commands and/or write commands. The commands of the winning computer component 124 are among those of the losing computer components 124, but it is not important as it already has higher priority because it is a winner.

As mentioned earlier, the RWA signal 261 is asserted when the precharge and activate read pointers 236 and 238 are ahead of the output 203 of the read/write queue 200. In this case, the banks at the head of the precharge and activate queues (208 and 204, respectively) of the command queue module 150 do not correspond to the head of the read/write queue 200, so the hit and act bits from row compare module 310 cannot necessarily be used to test the read/write queue 200.

At this point, the output 203 of the read/write queue 200 is assured of always being a bank hit anyway, otherwise the precharge and activate queues (208 and 204, respectively) of the command queue module 150 wouldn't have advanced. When the RWA signal 261 is asserted, the present invention can unload the read/write queue 200.

In use, the priority encoded arbiter 300 takes the want signals 317 from the possible command next matrix module 312 and chooses the one of highest priority in the predetermined order shown. It should be noted that other desired predetermined or dynamic orders may be employed by the user. As shown, the precharge and activate commands of the winning computer component 124 have a priority higher than that associated with read and write commands. This ensures that the bank will be prepared when the read/write queue 200 has the reference at the head of the queue 200. Operations of a losing computer component 124 are lower priority and only occur when a winning computer component 124 is blocked by the OK signals 313 and/or bank timeout signal 315. Closing timeout banks only happens when no other requesting computer component 124 can be granted access to memory 122.

The output of the priority encoded arbiter 300 selects the proper input queue from the various memory controller subsystems 132. The DRAM controller state machine module 304 is given the resulting command and, in turn, gives the command to the DRAM memory 122, and updates a state of the other memory controller subsystems 132 utilizing the unload and pullback signals (218, 220, 222, and 234). It should be noted that the selected queue also gets an unload signal.

Since high bandwidth and low latency are conflicting requirements in high performance memory systems, the present invention separates references from various computer components into multiple command streams. Each stream thus can hide precharge and activate bank preparation commands within its own stream for maximum bandwidth. Were these streams to be mixed, a high priority request would be serialized behind outstanding low priority requests.

While separating the multiple command streams may create a problem managing bank state of the memory for look ahead precharge and activate preparation, a page context switch technique may be employed that allows instantaneous switching from one look ahead stream to another to allow low latency while preserving maximum bank state from the previous stream.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method, comprising:
   providing at least three parallel-coupled memory controller subsystems each capable of:
       queuing read commands and write commands to be sent to the memory in at least one read/write queue with an input coupled to a computer component and an output coupled to memory,
       queuing precharge commands to be sent to the memory in a precharge queue with an input coupled to the computer component and an output coupled to the memory, and
       queuing activate commands to be sent to the memory in an activate queue with an input coupled to the computer component and an output coupled to the memory,
   wherein the precharge commands and the activate commands are queued in parallel for reducing the latency and increasing bandwidth associated with accessing the memory;
   wherein a first one of the memory controller subsystems is coupled to a graphics unit computer component, a second one of the memory controller subsystems is coupled to a central processing computer component, and a third one of the memory controller subsystems is coupled to a display refresh module computer component.

2. A computer program product for controlling at least three parallel-coupled memory controller subsystems, comprising:

computer code for queuing read commands and write commands to be sent to the memory in at least one read/write queue with an input coupled to a computer component and an output coupled to memory;

computer code for queuing precharge commands to be sent to the memory in a precharge queue with an input coupled to the computer component and an output coupled to the memory; and computer code for queuing activate commands to be sent to the memory in an activate queue with an input coupled to the computer component and an output coupled to the memory;

wherein the precharge commands and the activate commands are queued in parallel for reducing the latency and increasing bandwidth associated with accessing the memory;

wherein a first one of the memory controller subsystems is coupled to a graphics unit computer component, a second one of the memory controller subsystems is coupled to a central processing computer component, and a third one of the memory controller subsystems is coupled to a display refresh module computer component.

3. A memory controller system, comprising:

a plurality of memory controller subsystems coupled to a plurality of computer components, each memory controller subsystem including:

at least one read/write queue with an input coupled to one of the computer components and an output coupled to memory for queuing read commands and write commands to be sent to the memory, and at least one precharge/activate queue with an input coupled to one of the computer components and an output coupled to the memory for queuing precharge and activate commands to be sent to the memory;

wherein the precharge commands and the activate commands are capable of being restored to a row and a bank associated with the read commands and write commands at a head of the read/write queue.

4. The memory controller system as recited in claim 3, wherein the at least one precharge/activate queue includes a precharge queue with an input coupled to one of the computer components and an output coupled to the memory for queuing precharge commands to be sent to the memory, and an activate queue with an input coupled to one of the computer components and an output coupled to the memory for queuing activate commands to be sent to the memory.

5. The memory controller system as recited in claim 3, wherein the memory includes dynamic random access memory (DRAM).

6. The memory controller system as recited in claim 3, wherein the memory includes synchronous dynamic random access memory (SDRAM).

7. The memory controller system as recited in claim 4, wherein each memory controller subsystem further includes a multiplexer having inputs coupled to the outputs of the read/write queue, precharge queue and activate queue, the multiplexer further including an output coupled to the memory.

8. The memory controller system as recited in claim 3, wherein the read commands, the write commands, the precharge commands and the activate commands of each memory controller subsystem are loaded independent of the state of the memory.

9. The memory controller system as recited in claim 3, wherein the commands are loaded in at least one of the queues of each memory controller subsystem based on rows and banks of references in at least one of the queues.

10. The memory controller system as recited in claim 3, wherein the loading of the commands in it least one of the queues of each memory controller subsystem is delayed based on rows and banks of references in at least one of the queues.

11. The memory controller system as recited in claim 3, wherein each read/write queue is permitted to queue commands for only a single row in each bank.

12. The memory controller system as recited in claim 3, wherein the computer component is selected from the group consisting of a central processing unit, a display refresh module, and a graphics unit.

13. The memory controller system as recited in claim 3, wherein the memory controller system arbitrarily selects to unload commands from queues associated with any of the computer components.

14. A memory controller system, comprising:

a plurality of memory controller subsystems coupled to a plurality of computer components, each memory controller subsystem including:

(a) at least one read/write queue with an input coupled to one of the computer components and an output coupled to memory for queuing read commands and write commands to be sent to the memory, and (b) at least one precharge/activate queue with an input coupled to one of the computer components and an output coupled to the memory for queuing precharge and activate commands to be sent to the memory;

wherein the at least one precharge/activate queue includes a precharge queue with an input coupled to one of the computer components and an output coupled to the memory for queuing precharge commands to be sent to the memory, and an activate queue with an input coupled to one of the computer components and an output coupled to the memory for queuing activate commands to be sent to the memory;

wherein the precharge commands in the precharge queue and the activate commands in the activate queue are capable of being restored to a row and a bank associated with the read commands and write commands at a head of the read/write queue.

15. The memory controller system as recited in claim 14, wherein the memory includes dynamic random access memory (DRAM).

16. The memory controller system as recited in claim 14, wherein the memory includes synchronous dynamic random access memory (SDRAM).

17. The memory controller system as recited in claim 16, wherein each memory controller subsystem further includes a multiplexer having inputs coupled to the outputs of the read/write queue, precharge queue and activate queue, the multiplexer further including an output coupled to the memory.

18. The memory controller system as recited in claim 14, wherein the read commands, the write commands, the precharge commands and the activate commands of each memory controller subsystem are loaded independent of the state of the memory.

19. The memory controller system as recited in claim 14, wherein each read/write queue is permitted to queue commands for only a single row in each bank.

20. The memory controller system as recited in claim 14, wherein the computer component is selected from the group consisting of a central processing unit, a display refresh module, and a graphics unit.

21. The memory controller system as recited in claim 14, wherein the memory controller system arbitrarily selects to unload commands from queues associated with any of the computer components.

22. A method for controlling memory utilizing a memory controller, comprising:
receiving a plurality of read commands, write commands, precharge commands and activate commands from a plurality of queues capable of being loaded from a plurality of computer components independent of the state of the memory;
arbitrating the delivery of the read commands, write commands, precharge commands and activate commands from the queues to the memory; and
delivering the arbitrated read commands, write commands, precharge commands and activate commands to the memory;
wherein the memory controller is capable of restoring the precharge commands and the activate commands to a row and a bank associated with the read commands and write commands at a head of a read/write queue.

23. The method as recited in claim 22, wherein the memory includes dual data rate (DDR) memory.

24. The method as recited in claim 22, wherein the memory includes dynamic random access memory (DRAM).

25. The method as recited in claim 22, wherein the memory includes synchronous dynamic random access memory (SDRAM).

26. The method as recited in claim 22, wherein the delivery of the read commands, write commands, precharge commands and activate commands from the queues to the memory is arbitrated utilizing a timer.

27. The method as recited in claim 26, wherein the timer arbitrates the delivery of the commands to ensure that sequential commands are delivered sequentially.

28. The method as recited in claim 22, wherein the delivery of the read commands, write commands, precharge commands and activate commands from the queues to the memory is arbitrated based on a predetermined order.

29. The method as recited in claim 28, wherein the predetermined order prioritizes the computer components.

30. The method as recited in claim 28, wherein the predetermined order prioritizes the read commands, the write commands, the precharge commands and the activate commands.

31. The method as recited in claim 22, wherein the delivery of at least one of the commands is arbitrated based on a bank and a row at a head of the queues.

32. The method as recited in claim 22, wherein the delivery of at least one of the commands is arbitrated based on the read commands and write commands.

33. The method as recited in claim 22, wherein the computer components are selected from the group consisting of a central processing unit, a display refresh module, and a graphics unit.

34. The method as recited in claim 22, wherein the method is carried utilizing a memory controller coupled to the queues, the queues including:
(a) at least one read/write queue with an input coupled to one of the computer components and an output coupled to the memory for queuing read commands and write commands to be sent to the memory,
(b) a precharge queue with an input coupled to one of the computer components and an output coupled to the memory for queuing precharge commands to be sent to the memory, and
(c) an activate queue with an input coupled to one of the computer components and an output coupled to the memory for queuing activate commands to be sent to the memory.

35. The method as recited in claim 34, wherein the memory controller is capable of determining if banks specified by the precharge queue and the activate queue are activated or precharged.

36. The method as recited in claim 34, wherein it is determined whether a bank of the memory is precharged, and the precharge command queued in the precharge queue is disregarded if the corresponding bank of the memory is determined to be precharged.

37. The method as recited in claim 36, wherein the precharge command queued in the precharge queue is disregarded by unloading the precharge queue.

38. The method as recited in claim 34, wherein it is determined whether a bank of the memory is activated, and the activate command queued in the activate queue is disregarded if the corresponding bank of the memory is determined to be activated to the corresponding row.

39. The method as recited in claim 38, wherein the activate command queued in the activate queue is disregarded by unloading the activate queue.

40. The method as recited in claim 22, wherein the read commands, write commands, precharge commands and activate commands are arbitrated based on the state of the memory.

41. The method as recited in claim 22, wherein the delivery of at least one of the commands is arbitrated based on bandwidth sharing between the computer components.

42. The method as recited in claim 22, wherein the delivery of the read commands, write commands, precharge commands and activate commands are arbitrated to preserve bank states in the memory.

43. A method for controlling memory, comprising:
(a) receiving a plurality of read commands, write commands, precharge commands and activate commands from a plurality of queues capable of being loaded from a plurality of computer components independent of the state of the memory;
(b) arbitrating the delivery of the read commands, write commands, precharge commands and activate commands from the queues to the memory; and
(c) delivering the arbitrated read commands, write commands, precharge commands and activate commands to the memory; wherein the method is carried utilizing a memory controller coupled to the queues, the queues including:
(i) at least one read/write queue with an input coupled to one of the computer components and an output coupled to the memory for queuing read commands and write commands to be sent to the memory,
(ii) a precharge queue with an input coupled to one of the computer components and an output coupled to the memory for queuing precharge commands to be sent to the memory, and
(iii) an activate queue with an input coupled to one of the computer components and an output coupled to the memory for queuing activate commands to be sent to the memory;

wherein the memory controller is capable of restoring the precharge commands in the precharge queue and the activate commands in the activate queue to a row and a bank associated with the read commands and write commands at a head of the read/write queue.

44. The method as recited in claim 43, wherein the precharge commands and the activate commands in the precharge queue and the activate queue are restored based on a result of the arbitration.

45. The method as recited in claim 43, wherein the memory includes dual data rate (DDR) memory.

46. The method as recited in claim 43, wherein the memory includes dynamic random access memory (DRAM).

47. The method as recited in claim 43, wherein the memory includes synchronous dynamic random access memory (SDRAM).

48. The method as recited in claim 43, wherein the delivery of the read commands, write commands, precharge commands and activate commands from the queues to the memory is arbitrated utilizing a timer.

49. The method as recited in claim 48, wherein the timer arbitrates the delivery of the commands to ensure that sequential commands are delivered sequentially.

50. The method as recited in claim 43, wherein the delivery of the read commands, write commands, precharge commands and activate commands from the queues to the memory is arbitrated based on a predetermined order.

51. The method as recited in claim 50, wherein the predetermined order prioritizes the computer components.

52. The method as recited in claim 50, wherein the predetermined order prioritizes the read commands, the write commands, the precharge commands and the activate commands.

53. The method as recited in claim 43, wherein the delivery of at least one of the commands is arbitrated based on the read commands and write commands.

54. The method as recited in claim 43, wherein the computer components are selected from the group consisting of a central processing unit, a display refresh module, and a graphics unit.

55. A computer program product for controlling memory utilizing a memory controller, comprising:

computer code for receiving a plurality of read commands, write commands, precharge commands and activate commands from a plurality of queues capable of being loaded from a plurality of computer components independent of the state of the memory;

computer code for arbitrating the delivery of the read commands, write commands, precharge commands and activate commands from the queues to the memory; and computer code for delivering the arbitrated read commands, write commands, precharge commands and activate commands from the queues to the memory;

wherein the memory controller is capable of restoring the precharge commands in a precharge queue and the activate commands in an activate queue to a row and a bank associated with the read commands and write commands at a head of a read/write queue.

56. A memory controller for controlling memory utilizing a memory controller, comprising:

logic for receiving a plurality of read commands, write commands, precharge commands and activate commands from a plurality of queues capable of being loaded from a plurality of computer components independent of the state of the memory;

logic for arbitrating the delivery of the read commands, write commands, precharge commands and activate commands from the queues to the memory; and logic for delivering the arbitrated read commands, write commands, precharge commands and activate commands from the queues to the memory;

wherein the memory controller is capable of restoring the precharge commands in a precharge queue and the activate commands in an activate queue to a row and a bank associated with the read commands and write commands at a head of a read/write queue.

* * * * *

UNITED STATES PATENT AND TRADEMARK OFFICE
CERTIFICATE OF CORRECTION

PATENT NO.        : 6,647,456 B1
APPLICATION NO.   : 09/792874
DATED             : November 11, 2003
INVENTOR(S)       : Van Dyke et al.

Page 1 of 1

It is certified that error appears in the above-identified patent and that said Letters Patent is hereby corrected as shown below:

On the Title Page, Item (57)
At the end of the Abstract at line 29, insert --maximum bank state from the previous stream.--; after "preserving";

col. 14, line 11 replace "it" with --at--.

Signed and Sealed this

Sixteenth Day of February, 2010

David J. Kappos
*Director of the United States Patent and Trademark Office*